No. 716,655. Patented Dec. 23, 1902.
A. BACHNER.
APPARATUS FOR USE IN CATCHING FLIES OR INSECTS.
(Application filed Apr. 14, 1902.)
(No Model.) 2 Sheets—Sheet 1.

Witnesses:
O. F. Somek
M. A. Witherell

Inventor:
Adolf Bachner
by Knight Bros
Attys

No. 716,655. Patented Dec. 23, 1902.
A. BACHNER.
APPARATUS FOR USE IN CATCHING FLIES OR INSECTS.
(Application filed Apr. 14, 1902.)
(No Model.) 2 Sheets—Sheet 2.
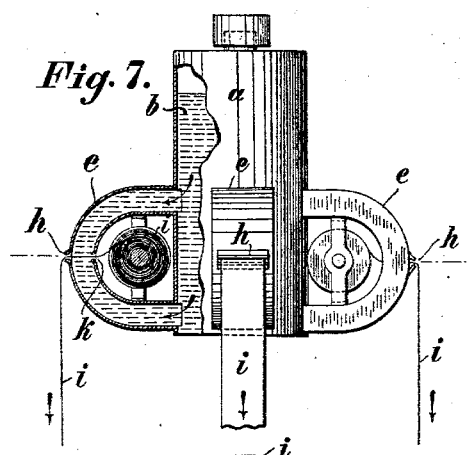
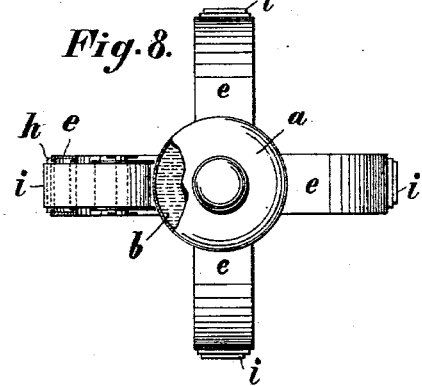

UNITED STATES PATENT OFFICE.

ADOLF BACHNER, OF FRANKFORT-ON-THE-MAIN, GERMANY.

APPARATUS FOR USE IN CATCHING FLIES OR INSECTS.

SPECIFICATION forming part of Letters Patent No. 716,655, dated December 23, 1902.

Application filed April 14, 1902. Serial No. 102,868. (No model.)

*To all whom it may concern:*

Be it known that I, ADOLF BACHNER, a subject of the Czar of Russia, and a resident of Blücherstrasse 25, Frankfort-on-the-Main, Germany, have invented certain new and useful Improvements in or Relating to Apparatus for Use in Catching Flies or Insects; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

A serious drawback in a fly or insect catching apparatus in which a strip of material is drawn through an adhesive substance is the fact that the strip after a short time is liable to issue from the receptacle without being provided with the adhesive substance. The cause is obviously due to the fact that the adhesive substance cannot be used in liquid consistency, but must be a pasty mass, so as to be prevented from dropping out of the receptacle. As soon as the portion of the adhesive substance in the immediate vicinity of the strip is carried off the adhesive mass does not advance to fill up the blank space and the strip leaves the apparatus uncoated, and therefore fails to fulfil its intended purpose.

According to the present invention the strip is normally kept dry, while the adhesive substance is fully utilized and the strip leaves the apparatus always provided with adhesive.

Figure 1:
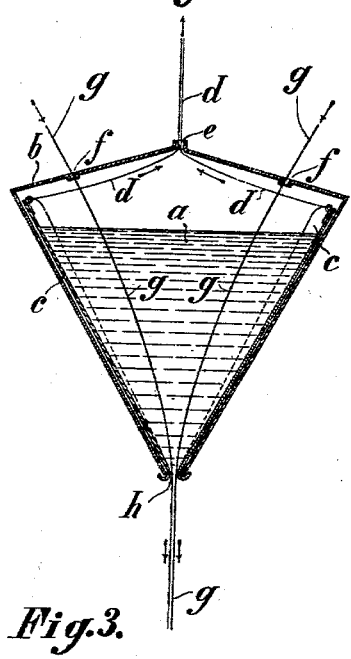
Figure 2:
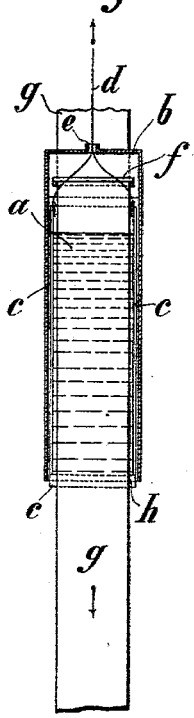
Figure 5:
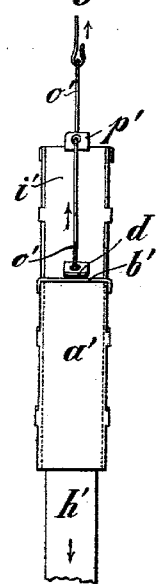
Figure 3:
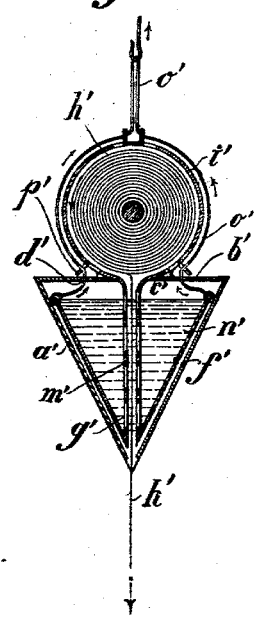
Figure 6:
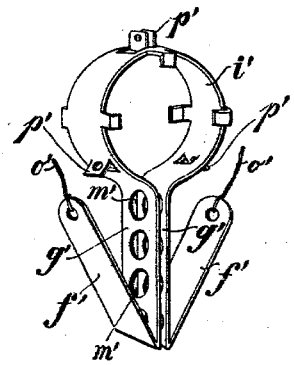
Figure 4:
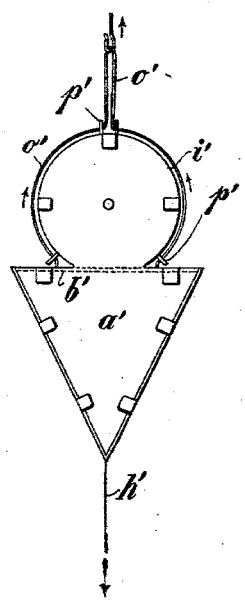

In the drawings, Figure 1 is a vertical section, and Fig. 2 is a cross-section, of one form of the apparatus. Fig. 3 shows a modified construction in vertical cross-section. Fig. 4 is a front elevation of the apparatus shown in Fig. 3, and Fig. 5 is a side elevation, and Fig. 6 is a perspective view of the inserted portion. Fig. 7 is a side view, partly in section, of another modified form of my invention; and Fig. 8 is a top plan view of the construction shown in Fig. 7.

In the construction shown in Fig. 1 the adhesive substance $a$ is contained in the receptacle $b$. Parallel to the side walls of the latter are arranged sides or plates $c$, to the upper ends of which are attached cords $d$, issuing from the receptacle through an opening $e$. Moreover, in the upper part of the receptacle are openings $f$, through which are introduced the strips $g$, which issue from the receptacle through a common lower opening $h$. The operation of this device is very simple. When the projecting part of the adhesive strip or strips is used up or covered with flies and a new part of the strip is to be drawn from the receptacle, the used part of the strip is cut or torn off close to the opening $h$ and the cords are drawn in an upward direction. Thus the plates $c$ approach each other and the adhesive material between them is pressed against the strip $g$, whereby they are provided with plenty of adhesive material on both sides before leaving the opening $h$. It is obvious that a complete utilization of the adhesive material can be effected, since the plates can be brought close together, so as to almost be in contact with each other.

Of course any number of strips could be introduced into the apparatus to increase the adhesive surface in order to catch a large number of insects.

A modified form of apparatus is provided with a device for containing the strips and for connecting the plates adapted to press the adhesive substance against the strips in a simple manner with the apparatus.

The outer box $a'$, Figs. 3 to 6, is closed at the top by a bridge-piece or cover $b'$, provided with a central slot $c'$ and two side openings $d'$. Into this box is inserted the ends or continuations of a ring-frame or loop $i$, formed of a single strip of metal having vertical depending portions $g\ g'$, which form a guide for the ends of the strip $h'$, which is rolled up in the ring-frame $i$ and is thus kept dry, and having its extremities bent back outwardly, so as to form plates or sides $f'$. The portions $g'$, serving as a guide for the strip, are provided with large perforations $m'$, which allow the adhesive substance $n'$ to pass to the strip. The plates $f'$ are connected to cords $o'$, which pass through convenient guides $p'$ on the outer edge of the ring-frame $i'$ and are adapted to support the device.

In the form shown in Figs. 7 and 8 a special construction of the apparatus is provided, wherein several strips $i$ are arranged, passing through openings *h* in bent tubes *e*, containing adhesive, in such a manner that they are provided simultaneously and uniformly with the adhesive substance by pressure exerted by the hand or otherwise upon the compressible container *a*.

Having thus described my invention, what I claim as new therein, and desire to secure by Letters Patent of the United States of America, is—

1. The combination with the receptacle for adhesive material, a strip of material to be coated, and means for guiding the strip through the receptacle, of plates adapted to press the adhesive material against the strip, and cords connected with the plates by which they are operated.

2. In apparatus of the kind described, the combination of the receptacle, a strip bent to form a ring or loop for receiving the roll of material to be coated, vertical portions serving as a guide for the strip of material to be coated, provided with perforations, and outwardly and upwardly bent extensions.

3. In an apparatus of the class described, the combination with the receptacle and a strip of material to be coated, of a strip bent to form a ring or loop for receiving the material to be coated, and perforated vertical portions serving as a guide for the strip to be coated; and means for pressing the adhesive within the receptacle against the strip.

4. The combination with the receptacle for an adhesive material, means guiding a strip therethrough, and means for exerting a pressure upon the adhesive to coat the strip.

5. The combination with the receptacle for an adhesive material, means for guiding a strip therethrough, and plates adapted to press the adhesive against the strip.

In testimony that I claim the foregoing as my invention I have signed my name in presence of two subscribing witnesses.

ADOLF BACHNER.

Witnesses:
MAX SENSENSCHMIDT,
GEORG ENGELHARDT.